United States Patent Office 2,978,337
Patented Apr. 4, 1961

2,978,337

PROCESS FOR THE PREPARATION OF FOOD PRESERVES, AND PARTICULARLY OF FRUIT JUICES PULVERISED BY SUBLIMATION UNDER HIGH VACUUM

Ottavio di Gaeta and Aliero Poggioli, both of Via G. Papio 20, Salerno, Italy

No Drawing. Filed June 3, 1958, Ser. No. 739,468

Claims priority, application Italy July 16, 1957

2 Claims. (Cl. 99—206)

All known processes for the preparation of food products capable of being preserved for an extended period of time while retaining as fully as possible the organoleptic properties of the fresh food, are based upon the principle of removing the micro-organisms that cause their alteration, i.e. of eliminating the molds, ferments, bacteria, bacilli and cocci which attack the natural food and within a certain length of time make it inedible.

Drying is one of the methods most frequently used, since the remotest times. This method, however, does not preserve the substances for an indefinite length of time, because a moderate amount of moisture in the space where the foods are stored is sufficient to cause the formation of molds and other micro-organisms which soon make the food inedible.

Other systems, such as smoking, preservation in oil, pickling, salting, preservation in alcohol or sugar, are widely used, but usually all of them result in a more or less substantial change in the original taste of the food.

The preservation process that forms the object of this invention offers the advantage of preserving for an indefinite length of time (based on the experience to this date, in no case less than three years), all of the characteristics of taste and flavor of the natural product, once the latter is re-processed to its original state, by the very simple process described below.

As a non-limiting example, the process according to the present invention is described below with special reference to the production of natural fruit juices, it being understood that other foods may be prepared with the same or a similar process, introducing such changes as may be from case to case suggested by known technical procedures.

The phases of the preparation of a fruit concentrate are the following:

(1) Selection and pressing of the fruit, preferably of the same quality, or at least of different qualities having organoleptic properties of similar stability;

(2) Concentration under vacuum of the juice or pulp thus obtained;

(3) Freezing of the concentrate;

(4) Sublimation of the product thus obtained under a very high vacuum.

After pressing, the whole juice or pulp are placed in a plant for concentration under vacuum, consisting of a stainless steel concentrator of substantially known type, fitted with a vacuum pump, stirring equipment and condenser. The vacuum pump will be preferably of the liquid-seal type, and capable of extracting totally the air, and the non-condensable gases in a quantity equal to the capacity of the condenser.

The final capacity of the concentration plant will be such that, after eight hours of operation, the quantity of the concentrated juice is reduced to one fifth of the initial volume.

Since the principal purpose of the process described herein is to obtain a product which, after reprocessing, possesses integrally all characteristics of the fresh fruit, none excluded, it is of the utmost importance that this concentration process take place at a temperature which will make it possible to maintain the natural flavor of the fruit. It was determined experimentally that this temperature should not exceed 35° C. (93.2° F.), or 40° C. (104° F.) in the case of certain fruit with more stable organoleptic properties.

At this point of the process, vitamin compounds may be added to the concentrate for the purpose of enhancing the nutritive qualities of the product. These compounds, however, are not part of the process itself, and are mentioned here purely for the purpose of indicating at which stage of the process this addition can be made.

After this possible addition, the mass of the concentrate is transferred to containers of suitable shape, size and insulating properties, and placed in a refrigeration cell, where its temperature is lowered to $-35°$ to $-45°$ C. ($-31°$ to $-49°$ F.). This treatment is followed by a sublimation process, which will remove all of the water still contained in the product. For this treatment, the product is placed in the sublimation plant where a high vacuum is created, ranging from .1 to .001 mm. of Hg. At the end of this stage, the product will have an average temperature of $+25°$ C. (77° F.) and a residual moisture content not in excess of .5 to 4%.

The sublimate which gathers on the walls of the vacuum chamber and containers is collected and carefully packed under vacuum.

In any case the process here described for the preparation of fruit juices does not alter the natural vitaminic content of said juices which can also be enriched by additions of other vitamin opportunely selected.

Under these conditions the product keeps indefinitely, and tests made three years after preparation have proved that, by adding water to the quantity contained in the natural juice, a product is obtained which is entirely similar to the latter in taste, flavor and nutritive properties.

What we claim is:

1. In a process for preparing concentrated edible fruit and vegetable juices which comprises the steps of pre-concentrating a juice under vacuum, freezing said juice and dehydrating the frozen product under vacuum, the improvements which consist in that the freezing of said juice takes place at a temperature of between $-35°$ C. and $-40°$ C., that the dehydration takes place under a high vacuum ranging between 0.1 micron and 0.001 micron and an average final temperature of $+25°$ C., the residual moisture content ranging between 0.5% and 4%, and that throughout the process the temperature is less than $+40°$ C.

2. A process for preparing concentrated edible fruit and vegetable juices, comprising pressing the fruits and vegetables, collecting the juice thereof, lowering the pressure on said juice to a vacuum, concentrating said juice under said vacuum at a maximum temperature of approximately 40° C. for approximately eight hours until the quantity of the concentrated juice is reduced to approximately one-fifth of its initial volume, freezing said concentrated juice at a temperature in the range of $-35°$ C. to $-45°$ C., and dehydrating the frozen concentrated juice under a vacuum in the range of 0.1 micron to 0.001 micron and an average final temperature of 25° C. with a residual moisture content ranging between 0.5% and 4%, and throughout the process the temperature is less than 40° C.

References Cited in the file of this patent

UNITED STATES PATENTS

| | | |
|---|---|---|
| 2,471,677 | Flosdorf | May 31, 1949 |
| 2,509,681 | Flosdorf | May 30, 1950 |
| 2,785,077 | Kaufman | Mar. 12, 1957 |